US008655282B2

(12) United States Patent
Luo et al.

(10) Patent No.: US 8,655,282 B2
(45) Date of Patent: Feb. 18, 2014

(54) MULTIPLE SIGNAL TRANSFORMATION IN WIRELESS RECEIVERS

(75) Inventors: Xiliang Luo, Cardiff, CA (US); Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 13/280,142

(22) Filed: Oct. 24, 2011

(65) Prior Publication Data

US 2012/0108175 A1 May 3, 2012

Related U.S. Application Data

(60) Provisional application No. 61/408,478, filed on Oct. 29, 2010.

(51) Int. Cl.
*H04W 24/00* (2009.01)

(52) U.S. Cl.
USPC ........ 455/63.1; 455/60; 455/63.2; 455/67.11; 455/67.13

(58) Field of Classification Search
USPC ....................................... 455/63.1
See application file for complete search history.

(56) References Cited

U.S. PATENT DOCUMENTS

| | | | | |
|---|---|---|---|---|
| 5,684,794 | A * | 11/1997 | Lopez et al. | 370/337 |
| 5,995,045 | A * | 11/1999 | Georghiades et al. | 342/418 |
| 6,166,685 | A * | 12/2000 | Soliman | 342/357.29 |
| 6,320,855 | B1 * | 11/2001 | Shi | 370/332 |
| 6,748,200 | B1 * | 6/2004 | Webster et al. | 455/234.1 |
| 6,829,534 | B2 * | 12/2004 | Fuchs et al. | 701/469 |
| 6,859,641 | B2 * | 2/2005 | Collins et al. | 455/63.1 |
| 7,092,459 | B2 * | 8/2006 | Sendonaris | 375/326 |
| 7,228,104 | B2 * | 6/2007 | Collins et al. | 455/63.1 |
| 7,254,402 | B2 * | 8/2007 | Vayanos et al. | 455/456.1 |
| 7,366,588 | B2 * | 4/2008 | Kim et al. | 700/276 |
| 7,627,049 | B2 * | 12/2009 | Kim | 375/260 |
| 7,715,836 | B2 * | 5/2010 | Vassiliou et al. | 455/423 |
| 7,782,294 | B2 * | 8/2010 | Albulet et al. | 345/156 |
| 7,782,967 | B2 * | 8/2010 | Cheng et al. | 375/260 |
| 7,826,969 | B2 * | 11/2010 | Hein et al. | 701/429 |
| 7,853,373 | B2 * | 12/2010 | Traster et al. | 701/23 |

(Continued)

FOREIGN PATENT DOCUMENTS

| | | |
|---|---|---|
| WO | WO2004028005 A1 | 4/2004 |
| WO | WO2010048899 A1 | 5/2010 |

OTHER PUBLICATIONS

International Search Report and Written Opinion—PCT/US2011/057629—ISA/EPO—Jan. 26, 2012.

(Continued)

*Primary Examiner* — Hai V Nguyen
(74) *Attorney, Agent, or Firm* — Fulbright & Jaworski LLP

(57) ABSTRACT

A frontend receiver of a user equipment (UE) is configured with multiple transform operations assigned to separate sets of cells. One set of cells includes the serving cell of the UE and at least one additional cell within a first offset range of the serving cell. Another set or sets of cells include additional interferer cells within another offset range of the serving cell. After tracking the common frequency/timing offsets of each set of cells the assigned transform operation for that set transforms the time domain samples into frequency domain symbols. The individual frequency/timing offsets for each cell within the set are then tracked.

46 Claims, 10 Drawing Sheets

(56) References Cited

U.S. PATENT DOCUMENTS

| | | | |
|---|---|---|---|
| RE42,543 E * | 7/2011 | Vayanos et al. | 455/456.1 |
| 8,063,825 B1 * | 11/2011 | Yang | 342/458 |
| 8,188,913 B2 * | 5/2012 | Henkel | 342/357.4 |
| 8,255,160 B2 * | 8/2012 | Duffett-Smith et al. | 701/470 |
| 8,320,866 B2 * | 11/2012 | Pratt et al. | 455/295 |
| 8,320,868 B2 * | 11/2012 | Pratt et al. | 455/296 |
| 2002/0123352 A1 * | 9/2002 | Vayanos et al. | 455/456 |
| 2002/0197958 A1 * | 12/2002 | Collins et al. | 455/63 |
| 2003/0087620 A1 * | 5/2003 | Sendonais | 455/266 |
| 2003/0145328 A1 * | 7/2003 | Rabinowitz et al. | 725/72 |
| 2003/0154025 A1 * | 8/2003 | Fuchs et al. | 701/213 |
| 2004/0219884 A1 * | 11/2004 | Mo et al. | 455/67.11 |
| 2005/0159128 A1 * | 7/2005 | Collins et al. | 455/284 |
| 2006/0061691 A1 * | 3/2006 | Rabinowitz et al. | 348/625 |
| 2006/0064725 A1 * | 3/2006 | Rabinowitz et al. | 725/68 |
| 2008/0002566 A1 * | 1/2008 | Zhang et al. | 370/208 |
| 2009/0281729 A1 * | 11/2009 | Duffett-Smith et al. | 701/213 |
| 2010/0085913 A1 | 4/2010 | Subrahmanya | |
| 2010/0278288 A1 * | 11/2010 | Panicker et al. | 375/343 |
| 2011/0105123 A1 * | 5/2011 | Lee et al. | 455/436 |
| 2011/0110251 A1 * | 5/2011 | Krishnamurthy et al. | 370/252 |
| 2011/0243104 A1 * | 10/2011 | Swarts et al. | 370/336 |
| 2012/0014467 A1 * | 1/2012 | Lindgren et al. | 375/260 |
| 2012/0033965 A1 * | 2/2012 | Zhang et al. | 398/38 |
| 2013/0170590 A1 * | 7/2013 | Hyll et al. | 375/343 |

OTHER PUBLICATIONS

Qualcomm Europe: "Range expansion for efficient support of heterogeneous networks" 3GPP Draft; R1-083813, 3rd Generation Partnership Project (3GPP), Mobile Competence Centre ; 650, Route des Lucioles ; F-06921 Sophia-Antipolis Cedex ; France, no. Prague, Czech Republic; 20080924, Sep. 24, 2008, XP050317137.

* cited by examiner

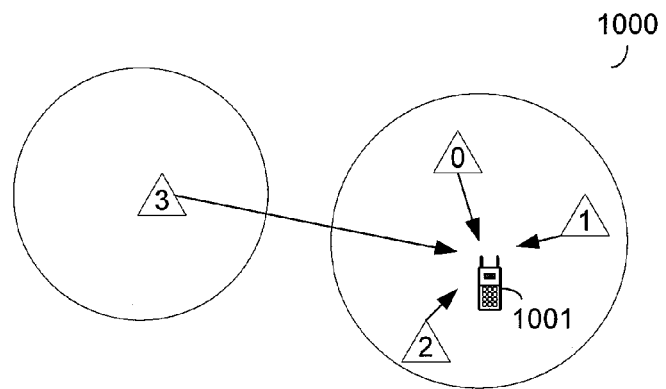
FIG. 10
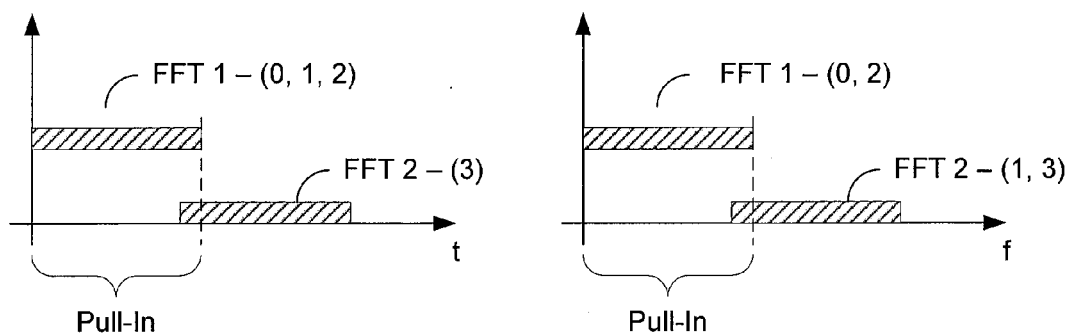
FIG. 11  FIG. 12
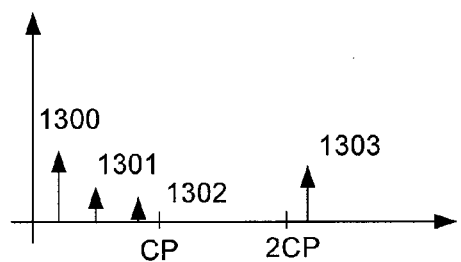
FIG. 13

MULTIPLE SIGNAL TRANSFORMATION IN WIRELESS RECEIVERS

This application claims the benefit of U.S. Provisional Patent Application No. 61/408,478, entitled, "MULTIPLE SIGNAL TRANSFORMATION IN WIRELESS RECEIVERS", filed on Oct. 29, 2010, which is expressly incorporated by reference herein in its entirety.

BACKGROUND

1. Field

Aspects of the present disclosure relate generally to wireless communication systems, and more particularly, to multiple signal transformation in wireless receivers.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various representative aspects of the present disclosure are directed to transformation of multiple signals in wireless receivers. When a UE receives the raw wireless signal, it may perform several operations on the signal to eventually gather the intended information from that received signal. At the frontend of a UE, the signal is converted from analog to digital by an analog-to-digital converter (ADC), sampled, offsets adjusted, transformed into the frequency domain, and then processed for channel estimation, demodulation, decoding, and the like. This frontend operation is similar through many UE receivers. However, the frontend processing for the common homogeneous networks will likely not operate efficiently in heterogeneous networks.

When operating in a heterogeneous network, the frequency or timing offset tracking is divided into two parts: a common part, in which the frequency/timing offset for the summation of all of the signals/cells is tracked at the chip/sample level; and an individual part, in which the frequency/timing offsets for each cell is tracked separately at the symbol level. For example, in an LTE-A heterogeneous network, the individual frequency/timing tracking is performed at the OFDM symbol level for each cell signal. The offsets of the time domain samples are commonly tracked at a common frequency/timing tracking module. Because the chip/sample level tracking is performed on the summation of signals from multiple cells, the tracked offsets tend to track the strongest cell, which may not always be the serving cell in a heterogeneous network.

After offset adjustments are made, a serial-to-parallel (S/P) fast Fourier transform (FFT) module converts the time domain samples from serial to parallel and transforms them into the frequency domain. The operation of the frontend is then divided to perform individual frequency/timing tracking for signals of each of the cells from which signals are received at the UE. The signals from each of the cells are separately tracked at the symbol level by individual frequency/timing tracking modules. Based on any individual offsets detected, additional adjustments may be made to the received signals. A signal processing module processes the frequency domain signals for channel estimation, demodulation, decoding, and the like, after which they will be available outside of the UE frontend for further processing by the UE.

In one aspect of the disclosure, a method of wireless communication at a UE that includes tracking a first common offset corresponding to a first group of cells, the first group of cells including a serving cell and at least one cell having an offset within a first range of the serving cell, transforming multiple time domain samples into a first number of frequency domain symbols using the offset and a first transformation operation assigned to the first group of cells. The method further includes tracking a first individual offset of the first number of frequency domain symbols for each cell within the first group of cells, tracking a second common offset corresponding to a second group of cells, the second group of cells including at least one cell having an offset within a second range of the serving cell, transforming the time domain samples into a second number of frequency domain symbols using the second offset and a second transformation operation assigned to the second group of cells, and tracking a second individual offset of the second number of frequency domain symbols for each cell within the second group of cells.

In an additional aspect of the disclosure, a UE configured for wireless communication. The UE includes means for tracking a first common offset corresponding to a first group of cells, the first group of cells including a serving cell and at least one cell having an offset within a first range of the serving cell, means for transforming multiple time domain samples into a first number of frequency domain symbols using the offset and a first transformation operation assigned to the first group of cells. The UE also includes means for tracking a first individual offset of the first number of frequency domain symbols for each cell within the first group of cells, means for tracking a second common offset corresponding to a second group of cells, the second group of cells including at least one cell having an offset within a second range of the serving cell, means for transforming the time domain samples into a second number of frequency domain symbols using the second offset and a second transformation operation assigned to the second group of cells, and means for tracking a second individual offset of the second number of frequency domain symbols for each cell within the second group of cells.

In an additional aspect of the disclosure, a computer program product has a computer-readable medium having program code recorded thereon. This program code includes code to track a first common offset corresponding to a first group of cells, the first group of cells including a serving cell and at least one cell having an offset within a first range of the serving cell, code to transform multiple time domain samples into a first number of frequency domain symbols using the offset and a first transformation operation assigned to the first group of cells, code to track a first individual offset of the first number of frequency domain symbols for each cell within the first group of cells, code to track a second common offset corresponding to a second group of cells, the second group of cells including at least one cell having an offset within a second range of the serving cell, code to transform the time domain samples into a second number of frequency domain symbols using the second offset and a second transformation operation assigned to the second group of cells, and code to track a second individual offset of the second number of frequency domain symbols for each cell within the second group of cells.

In an additional aspect of the disclosure, an apparatus includes at least one processor and a memory coupled to the processor. The processor is configured to track a first common offset corresponding to a first group of cells, the first group of cells comprising a serving cell and at least one cell having an offset within a first range of the serving cell. The processor is further configured to transform multiple time domain samples into a first number of frequency domain symbols using the offset and a first transformation operation assigned to the first group of cells, to track a first individual offset of the first number of frequency domain symbols for each cell within the first group of cells, to track a second common offset corresponding to a second group of cells, the second group of cells including at least one cell having an offset within a second range of the serving cell, to transform the time domain samples into a second number of frequency domain symbols using the second offset and a second transformation operation assigned to the second group of cells, and to track a second individual offset of the second number of frequency domain symbols for each cell within the second group of cells.

BRIEF DESCRIPTION OF THE DRAWINGS

FIG. 10 is a conceptual block diagram of a UE configured according to one aspect of the present disclosure.

FIG. 11 is a graph conceptually illustrating FFT symbols received on a time axis.

FIG. 12 is a graph conceptually illustrating FFT symbols received on a frequency axis.

FIG. 13 is a graph conceptually illustrating signals received from eNBs on a cyclic prefix (CP) axis.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
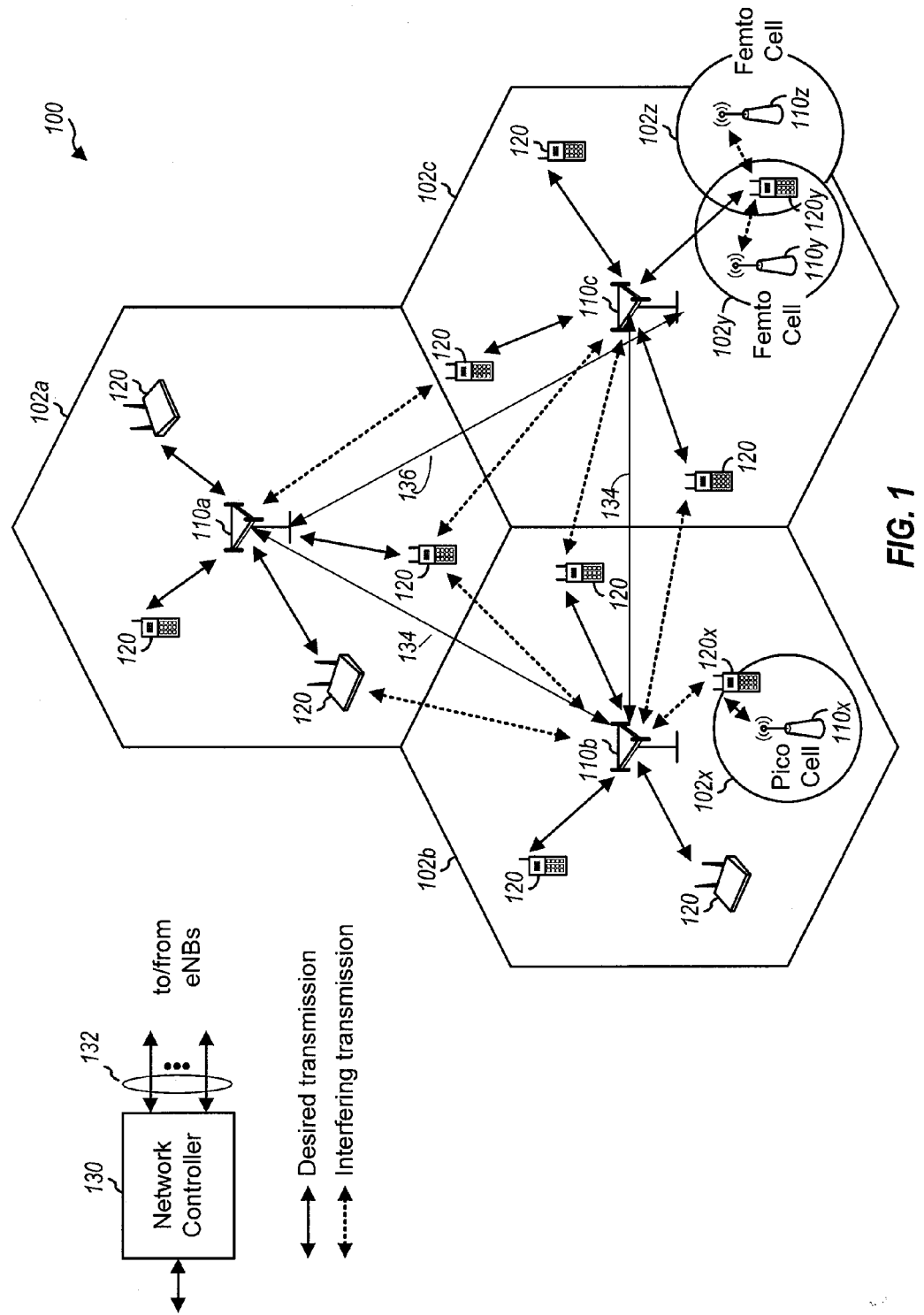
FIG. 1 is a block diagram conceptually illustrating an example of a mobile communication system.

FIG. 1 shows a conceptual wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
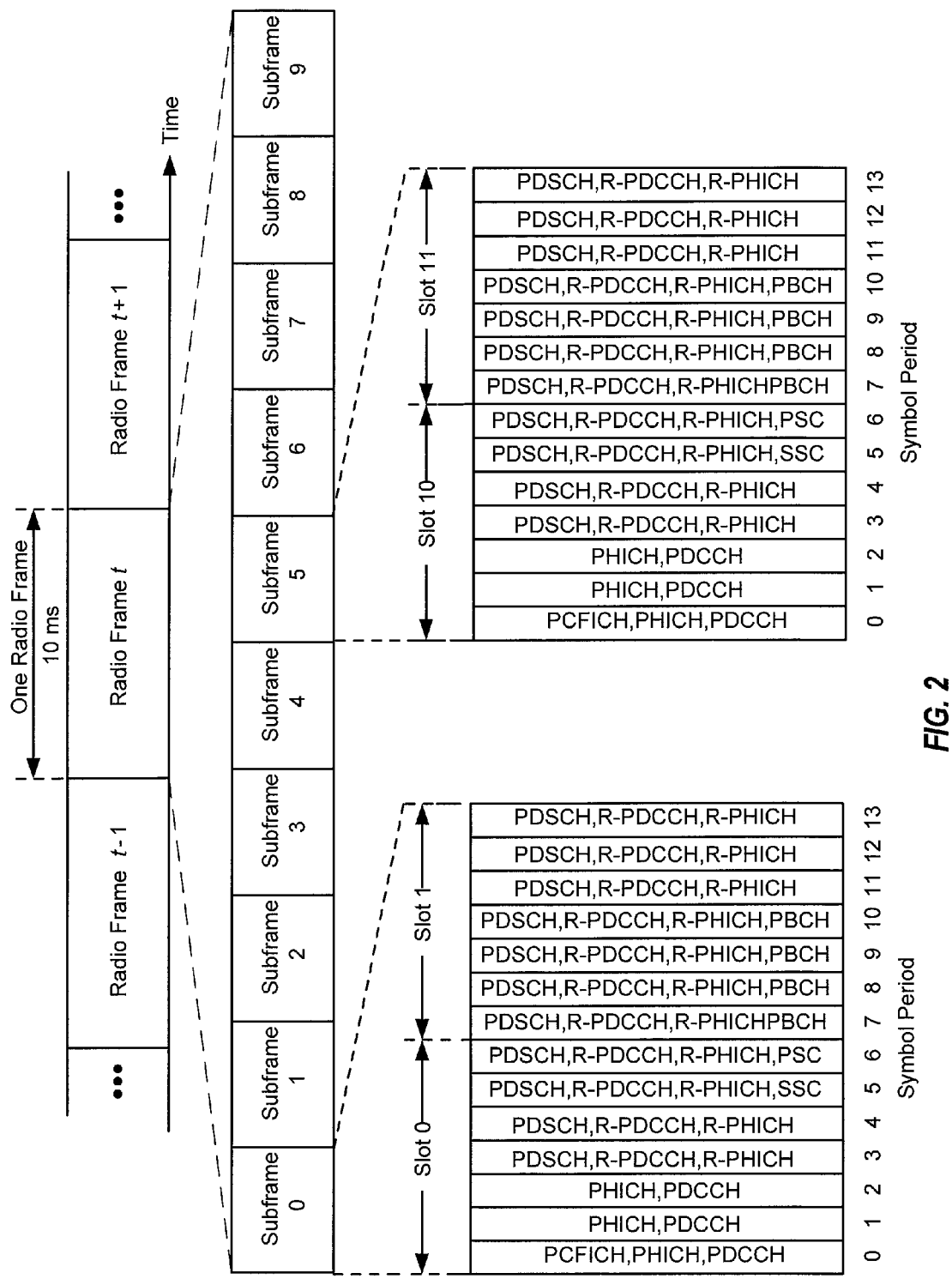
FIG. 2 is a block diagram conceptually illustrating an example of a downlink frame structure in a mobile communication system.

FIG. 2 shows a conceptual downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
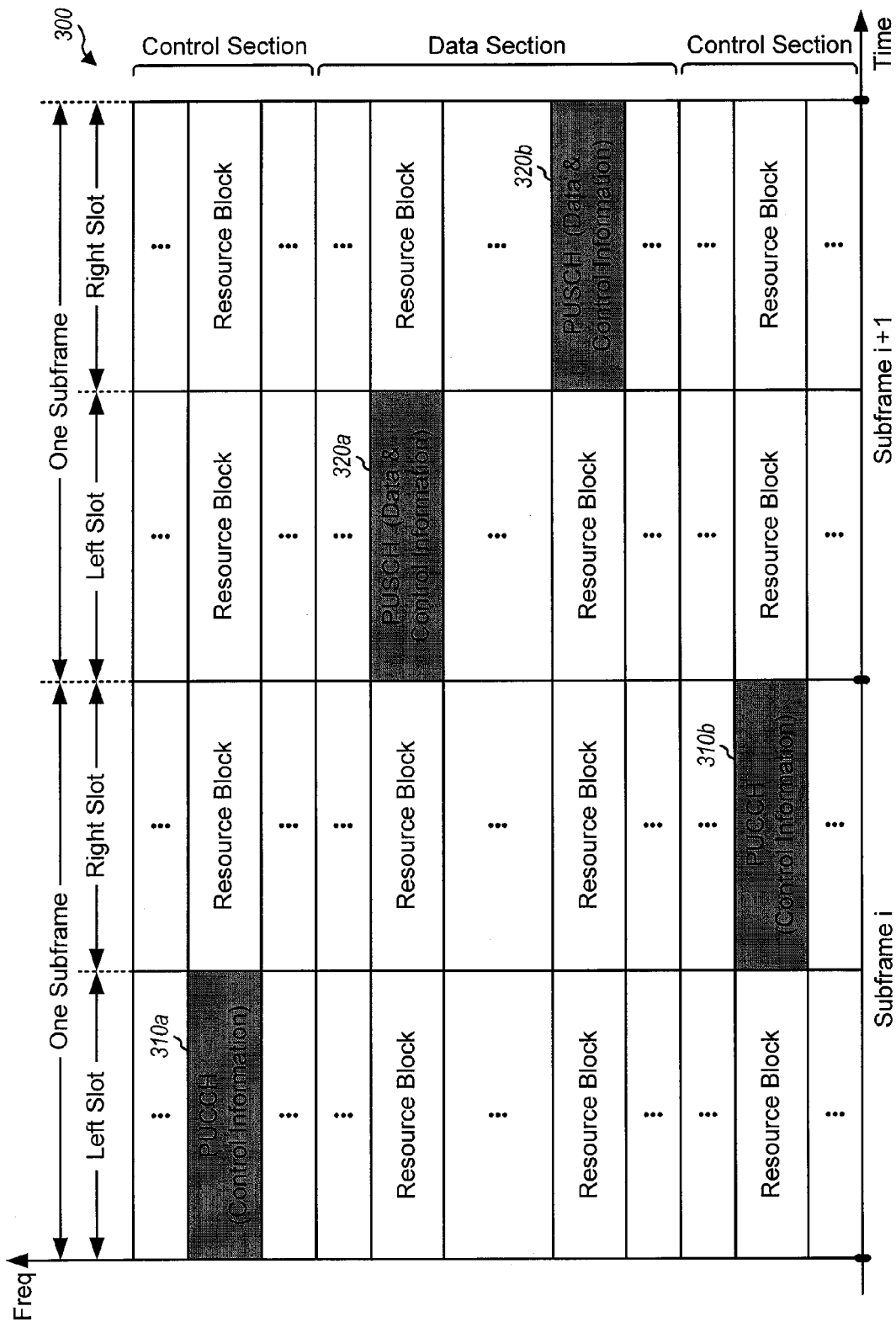
FIG. 3 is a block diagram conceptually illustrating an exemplary frame structure in uplink LTE/-A communications.

FIG. 3 is a conceptual block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmits at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×10$^8$, i.e., the speed of light, 'c'). Comparing that downlink signal from the macro eNB to the downlink signal from a much closer femto eNB, the timing difference could approach the level of a timing tracking loop (TTL) error or be well beyond the cyclic prefix length.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4:
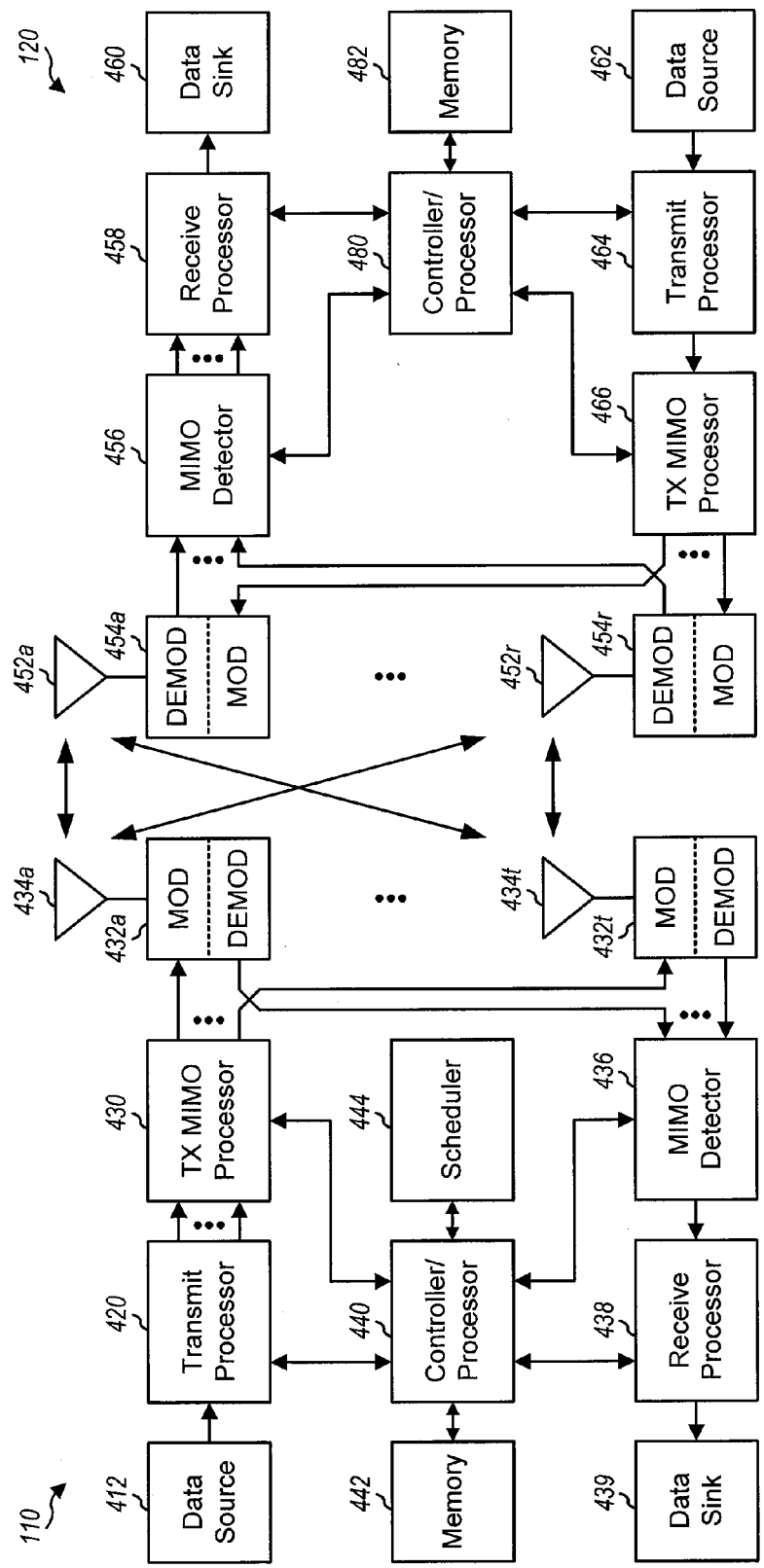
FIG. 4 is a block diagram conceptually illustrating a design of a base station/eNB and a UE configured according to one aspect of the present disclosure.

FIG. 4 shows a conceptual block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The processor 440 and/or other processors and modules at the eNB 110 may perform or direct the execution of various processes for the techniques described herein. The processor 480 and/or other processors and modules at the UE 120 may also perform or direct the execution of the functional blocks illustrated in FIG. 9, and/or other processes for the techniques described herein. The memories 442 and 482 may store data and program codes for the eNB 110 and the UE 120, respectively. A scheduler 444 may schedule UEs for data transmission on the downlink and/or uplink.

Beginning from the raw received signal, a UE, such as UE 120, performs several operations on the signal to eventually gather the intended information from that received signal. At the frontend of a UE, the signal is converted from analog to digital by an analog-to-digital converter (ADC), sampled, offsets adjusted, transformed into the frequency domain, and then processed for channel estimation, demodulation, decoding, and the like. This frontend operation is similar through many UE receivers. However, with the configurations of advanced networks migrating towards heterogeneous networks, such as LTE-A network, the "normal" frontend processing may begin to experience less than optimal performance.

Figure 5:
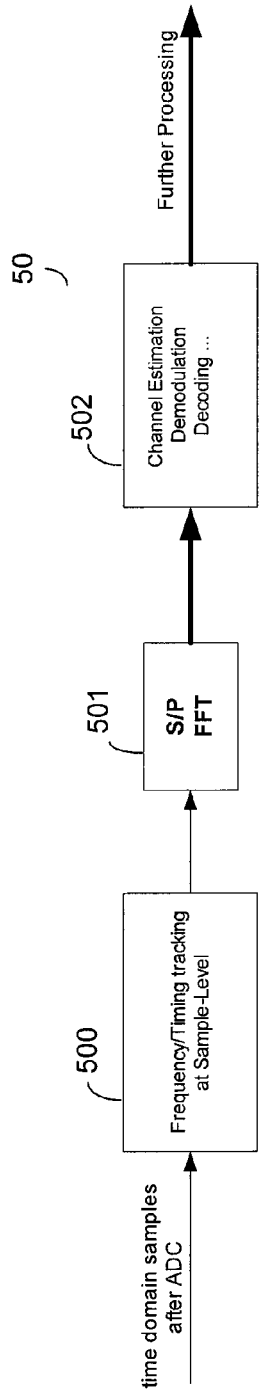
FIG. 5 is a conceptual block diagram illustrating a frontend of a UE configured for a homogenous wireless network.

FIG. 5 is a conceptual block diagram illustrating a frontend 50 of a UE configured for a homogenous wireless network. The frontend 50 of the UE performs various operations of identifying signals, performing timing/frequency offsets, and the like. After analog-to digital conversion, the frequency or timing offsets of the time domain samples are tracked and adjusted at a frequency/timing tracking module 500. Whether frequency or timing offsets are tracked will depend on the parameters of the underlying communication network that the UE is located. Serial-to-Parallel (S/P) Fast Fourier Transform (FFT) module 501 converts the time domain samples from serial to parallel and also transforms the time domain samples into the frequency domain. A signal processing module 502 then processes the frequency domain signals for channel estimation, demodulation, decoding, and the like. The signals then move out of the UE frontend 50 for further processing by the UE.

This operation of the frontend 50 is optimized for a homogeneous network, where the UE is most interested in signals from its own serving cell. In such homogeneous systems, the signal from the serving cell is most commonly the strongest signal. All other signals are interference. However, in a heterogeneous network, the UE is not only interested in tracking its serving cell, but also any strong signals of neighboring cells. Moreover, in a heterogeneous network, the strongest signal may not be from the serving cell. Therefore, accounting for the frequency/timing offsets may become more difficult.

Figure 6:
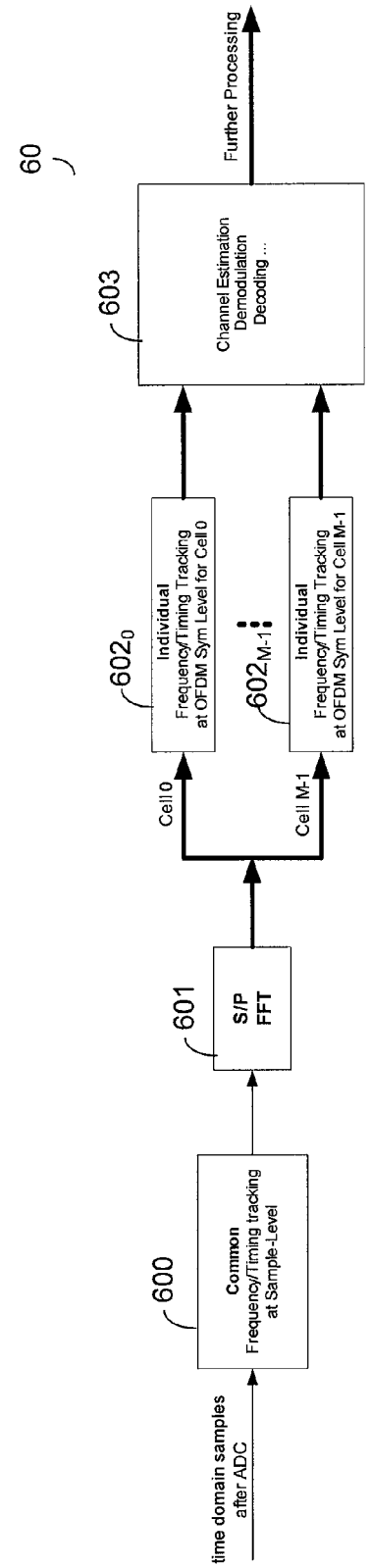
FIG. 6 is a conceptual block diagram illustrating a frontend of a UE configured for a heterogeneous network.

FIG. 6 is a conceptual block diagram illustrating a frontend 60 of a UE configured for a heterogeneous network. When operating in a heterogeneous network, the frequency or timing offset tracking is divided into two parts: a common part, in which the frequency/timing offset for the summation of all of the signals/cells is tracked at the chip/sample level; and an individual part, in which the frequency/timing offsets for each cell is tracked separately at the symbol level. For example, in an LTE-A heterogeneous network, the individual frequency/timing tracking is performed at the OFDM symbol level for each cell signal. With reference to FIG. 6, the offsets of the time domain samples are commonly tracked at a common frequency/timing tracking module 600. Because the chip/sample level tracking is performed on the summation of signals from multiple cells, the tracked offsets tend to track the strongest cell, which, as noted, may not always be the serving cell in a heterogeneous network.

After offset adjustments are made, an S/P FFT module 601 converts the time domain samples from serial to parallel and transforms them into the frequency domain. The operation of the frontend 60 is now divided to perform individual frequency/timing tracking for signals of each of the cells, Cell 0-Cell M−1, where M is the total number of cells from which signals are received at the UE. The signals from each of Cell 0-Cell M−1 are separately tracked at the symbol level by the individual frequency/timing tracking modules $602_0$ and $604_{M-1}$, respectively. Based on any individual offsets detected, additional adjustments may be made to the received signals. A signal processing module 604 then processes the frequency domain signals for channel estimation, demodulation, decoding, and the like, after which they will be available outside of the UE frontend 60 for further processing by the UE.

The configuration of frontend 60 will operate accurately when the frequency/timing offsets among the serving and strong interfering neighboring cells is relatively small. Smaller offsets do not generally require large adjustments. Therefore, the accuracy of the exact offset and any corresponding adjustment becomes less important since a small error in a relatively small offset or adjustment may not cause a wholly inaccurate estimate of the cell signals. However, when the frequency/timing offsets become larger, probabilities increase that an error in the offset or corresponding adjustment may be relatively large enough to cause inaccurate signal estimates. For example, if the frequency offset is +500 kHz from Cell 0 and −500 kHz from a Cell M−1 and the signals are of similar strength, when the common tracking is performed at the common frequency/timing tracking module 600, there will be no adjustments made because the summation of cell signals at the common stage would result in the appearance of no frequency offset. Therefore, if the individual frequency/timing tracking modules $602_0$ and $602_{M-1}$ do not accurately track the +/−500 kHz offsets, respectively, for Cell 0 to Cell M−1, the frontend 60 may not adequately compensate for the offset at the symbol level which could lead to inaccurate signal estimation, making it more difficult to accurately cancel interference from the interfering cells.

It should be noted that, in an LTE-A heterogeneous network, for example, a single OFDM symbol is 66.67 μs. A UE configured with the frontend 60 will perform accurately when the frequency/timing offsets among the serving cell and the strong interfering neighboring cells remains within approximately +/−1 kHz (frequency offset) or +/−11 μs (timing offset).

Figure 7:
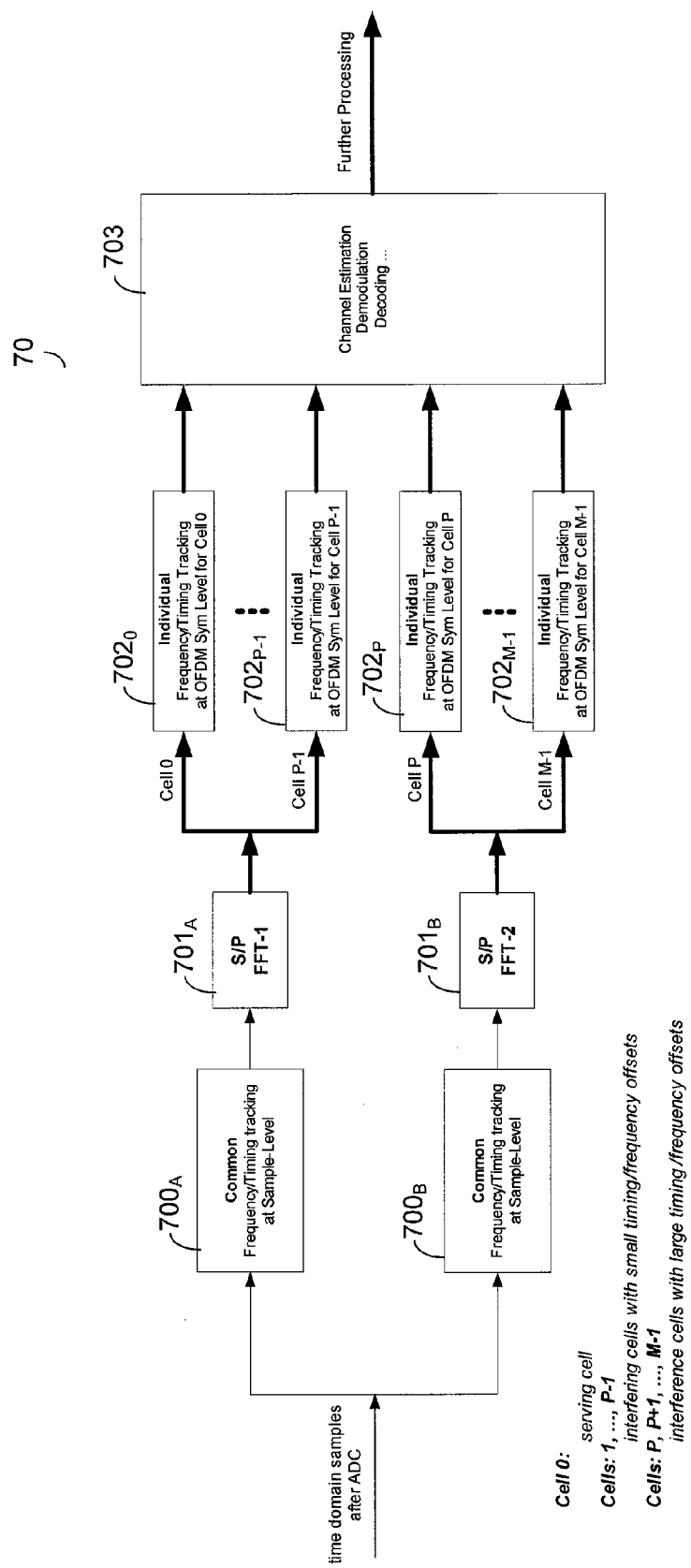
FIG. 7 is a conceptual block diagram illustrating a frontend configured according to one aspect of the present disclosure for a UE in a heterogeneous network.

FIG. 7 is a conceptual block diagram illustrating a frontend 70 configured according to one aspect of the present disclosure for a UE in a heterogeneous network. The frontend 70 is configured as a dual FFT receiver. After analog-to-digital conversion, the time domain samples are processed through dual processing legs. The serving cell, Cell 0, and interfering cells that have relatively small frequency/timing offsets, Cells 1-P−1, are commonly tracked at a common frequency/timing tracking module $700_A$. An S/P FFT $701_A$, which is assigned to this serving cell group of cells, serial-to-parallel converts and transforms the time domain samples into the frequency domain. Each of the cells, Cell 0-Cell P−1, is then individually tracked by individual frequency/timing tracking modules $702_0$ to $702_{P-1}$, respectively. A signal processing module 703 then processes the frequency domain signals for channel estimation, demodulation, decoding, and the like. Because the cell signals processed by this first leg have relatively small offsets, the frontend 70 will accurately estimate the signals.

The remaining cells, Cell P-Cell M−1, have larger frequency/timing offsets from the serving cell and are commonly tracked in the second processing leg beginning at a common frequency/timing tracking module $700_B$. An S/P FFT $701_B$, which is assigned to the remaining interferer cells, serial-to-parallel converts and transforms the time domain samples into the frequency domain. Each of the cells, Cell P-Cell M−1, is then individually tracked by the individual frequency/timing tracking modules $702_P$ to $702_{M-1}$, respectively, and a signal processing module 703 processes the frequency domain signals for channel estimation, demodulation, decoding, and the like. While the cells processed in the second processing leg have larger offsets from the serving cell, their offsets may not be so large relative to the other cells processed in the second processing leg. Therefore, the frontend 70 will likely be capable of accurately estimating the signals in the second processing leg as well.

The frontend 70 assigns one FFT operation, the S/P FFT $701_A$, to always track the serving cell along with some interfering neighbors having relatively small frequency/timing, while the other FFT operation, the S/P FFT $701_B$, is assigned to track the remaining strong interferers. The dual FFT processing allows the relative offsets to be controlled, which results in more accurate signal estimation in heterogeneous networks. With the configuration of the frontend 70, interference cancellation may be performed iteratively over the outputs of S/P FFTs $701_A$ and $701_B$.

Figure 8:
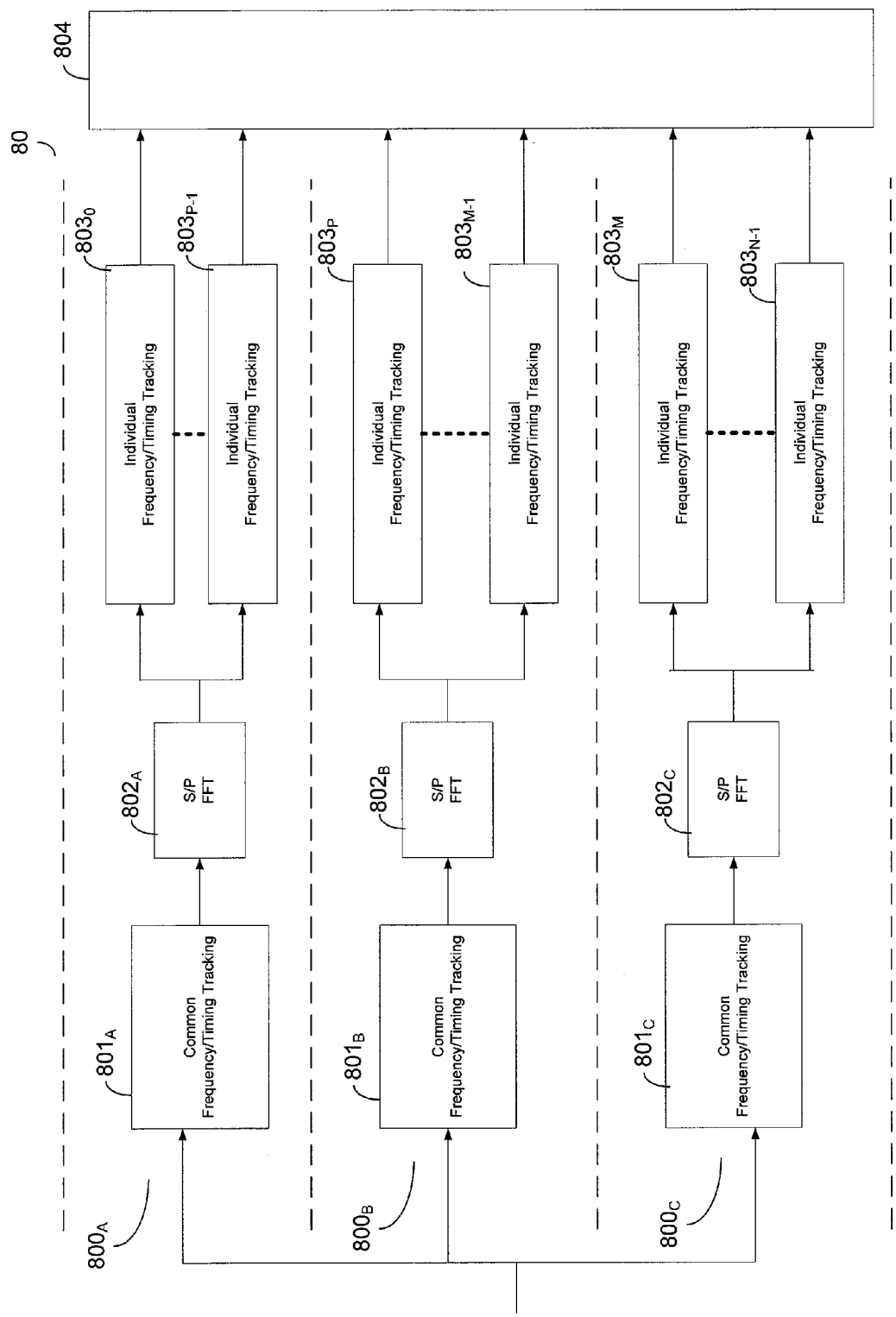
FIG. 8 is a conceptual block diagram illustrating a frontend configured according to one aspect of the present disclosure for a UE in a heterogeneous network.

It should be noted that the various aspects of the present disclosure are not limited to only dual FFT processing. Additional aspects may incorporate or be configured with more than two FFT processing modules. FIG. 8 is a conceptual block diagram illustrating a frontend 80 configured according to one aspect of the present disclosure for a UE in a heterogeneous network. The frontend 80 is configured with multiple processing legs $800_A$-$800_C$. Each of the processing legs $800_A$-$800_C$ includes its own FFT operation, the S/P FFTs $802_A$-$802_C$. The processing leg $800_A$ along with the S/P FFT $802_A$ are assigned by the frontend 80 to track the serving cell and any interfering cells having a relatively small frequency/timing offset from the serving cell. Each of the other processing legs $800_B$-$800_C$ along with the S/P FFTs $802_B$-$802_C$ are assigned to track addition sets of interfering cells where each cell within the sets has a frequency/timing offset that falls within a predetermined range from the serving cell. For example, each of the processing legs $800_B$ and $800_C$, along with their respective S/P FFT $802_B$ and S/P FFT $802_C$ may be assigned to interfering cells with frequency/timing offsets falling within range widths of approximately +/−1 kHz or +/−11 μs.

The processing leg $800_A$ provides common tracking at common tracking module $801_A$ and individual tracking at individual tracking modules $803_0$-$803_{P-1}$. Similarly, in processing legs 800$_B$-800$_C$, common tracking is provided at common tracking modules 801$_B$-801$_C$, respectively, and individual tracking at individual tracking modules 803$_P$-803$_{M-1}$ and 803$_M$-803$_N$, respectively. A signal processing module 804 then processes the frequency domain signals for channel estimation, demodulation, decoding, and the like, of each of the processing legs 800$_A$-800$_C$. As with the dual-FFT configuration of frontend 70 (FIG. 7), frontend 80 assigns an FFT operation for the serving cell, the S/P FFT 802$_A$, and multiple other FFT operations for interfering cells within each set of offset ranges, for example, the S/P FFTs 802$_B$ and 802$_C$. By providing the multiple FFT operations, frontend 80 can more accurately estimate signals both the signals from the serving cell and the signals from the interfering cells.

In the embodiment described with respect to FIG. 8, interference cancellation may be applied among the time domain or frequency domain samples derived from the processing leg 800$_A$ (which samples and signals from the processing leg 800$_A$ may be referred to generally as an FFT cluster) and other time domain or frequency domain samples from the other processing legs 800$_B$ and 800$_C$ (which also may be referred to generally as FFT clusters). The cancellation order of the plurality of time domain or frequency domain samples of the FFT clusters may be determined. Time and/or frequency domain interference cancellation may be applied to a subset of the FFT clusters. Also, the total number of FFT clusters can be determined by relative timing/signal strength, serving cell location, and the like, and can be dynamically adjusted across different subframes. Moreover, interference cancellation may be iteratively applied across or between different FFT clusters, where some clusters use a time domain interference cancellation, while other clusters, which may have been dynamically adjusted, may used frequency domain interference cancellation after time domain interference cancellation has been applied by other FFT clusters. Thus, the scope of interference cancellation techniques and procedures that may be used with the various aspects of the present disclosure are not limited to any one particular technique or process.

Figure 9:
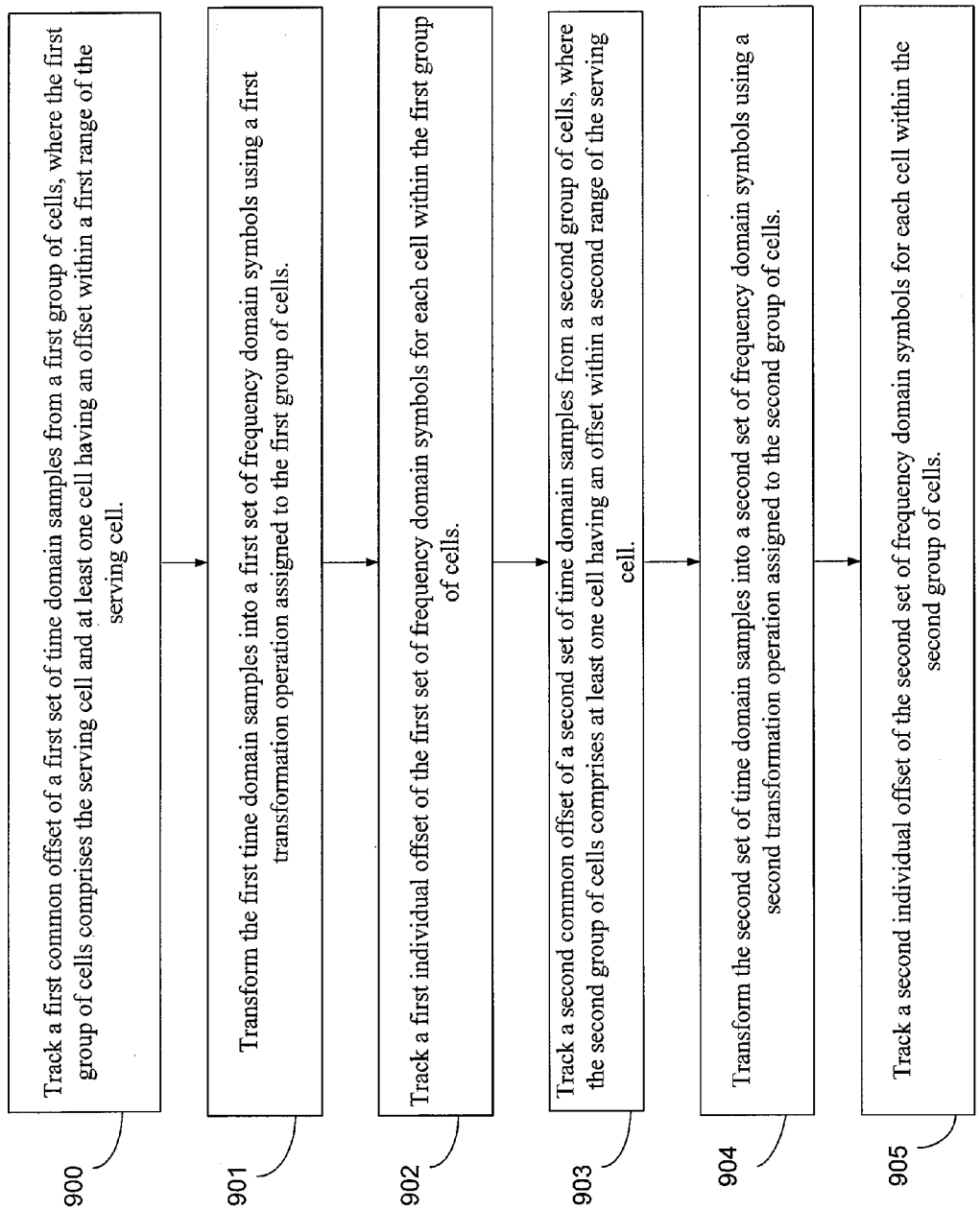
FIG. 9 is a functional block diagram illustrating example blocks executed to implement one aspect of the present disclosure.

FIG. 9 is a functional block diagram illustrating example blocks executed to implement one aspect of the present disclosure. In block 900, a first common offset of a first set of time domain samples from a first group of cells is tracked, where the first group of cells comprises the serving cell and at least one cell having an offset within a first range of the serving cell. The first time domain samples are transferred, in block 901, into a first set of frequency domain symbols using a first transformation operation assigned to the first group of cells. A first individual offset of the first set of frequency domain symbols is tracked, in block 902, for each cell within the first group of cells. A second common offset of a second set of time domain samples from a second group of cells is tracked, in block 903, where the second group of cells comprises at least one cell having an offset within a second range of the serving cell. In block 904, the second set of time domain samples is transformed into a second set of frequency domain symbols using a second transformation operation assigned to the second group of cells. A second individual offset of the second set of frequency domain symbols is tracked, in block 905, for each cell within the second group of cells.

In one configuration, the UE 120 configured for wireless communication includes means for tracking a first common offset corresponding to a first group of cells, said first group of cells including a serving cell and at least one cell having an offset within a first range of said serving cell, means for transforming multiple time domain samples into a first number of frequency domain symbols using said offset and a first transformation operation assigned to said first group of cells. The UE also includes means for tracking a first individual offset of said first number of frequency domain symbols for each cell within said first group of cells, means for tracking a second common offset corresponding to a second group of cells, said second group of cells including at least one cell having an offset within a second range of said serving cell, means for transforming said time domain samples into a second number of frequency domain symbols using said second offset and a second transformation operation assigned to said second group of cells, and means for tracking a second individual offset of said second number of frequency domain symbols for each cell within said second group of cells. In one aspect, the aforementioned means may be the processor(s), the controller/processor 480, the memory 482, the receive processor 458, the MIMO detector 456, the demodulators 454a, and the antennas 452a configured to perform the functions recited by the aforementioned means. In another aspect, the aforementioned means may be a module or any apparatus configured to perform the functions recited by the aforementioned means.

FIG. 10 illustrates a UE 1001 configured according to one aspect of the present disclosure. UE 1001 is located within a wireless communication system 1000, which is a heterogeneous network. UE 1001 receives signals from eNBs 0, 1, 2, and 3. It may be desirable for UE 1001 to have multiple S/P FFTs on the frontend in order to handle arriving signals that are not fully synchronized. This may occur regardless of whether the system is synchronous, asynchronous, or the UE is between sectors that may be synchronous with the sector, but asynchronous between sectors. In a synchronous network, the signals may not be fully synchronized because of the distance the signal has to travel. For example, the signals that UE 1001 receives from eNBs 0, 1, and serving eNB 2 are close enough, such that the signals remain in good synchronization, while the signals received by UE 1001 from eNB 3, which is much further from UE 1001, are not synchronized with those from eNBs 0, 1, and 2. If UE 1001 were configured with a single S/P FFT in its frontend, it could track the offsets between the signals of eNBs 0, 1, and 2, as they are not offset by very much. Each of these signals would be within UE 1001's pull-in range of serving eNB 2. That is, the offset between the signals is small enough to allow the UE 1001 to adjust the offset and decoding the complete signal. The pull-in region is generally around the distance of the signal cyclic prefix (CP) from the service cell's signal. If the UE 1001 would need to offset the signal more than the CP, it would not have enough information to recover the underlying signal.

For example, FIG. 11 shows the first FFT (FFT1) from eNBs 0, 1, and 2 falling completely within the pull-in range of the UE 1001. However, the second FFT (FFT2) from eNB 3, arrives at a time that places is mostly outside of the pull-in range. Therefore, in this example, the UE 1001 would not be able to recover the signal represented by FFT2 and, thus, could not correctly offset or likely even cancel.

In a synchronous network, timing may be synchronized, but frequency may not. For example, femto eNBs for closed subscriber groups (CSGs) are often built to looser standards than macro eNBs. Thus, the frequencies of such femto eNBs may fluctuate to the point where the signals are offset enough to fall outside of the UE's pull-in range. FIG. 12 illustrates two FFT symbols for two groups of cells in wireless communication system 1000. FFT1 represents the FFT symbol received from eNB 0 and serving eNB 2. These signals were received within the pull-in range of UE 1001. FFT2 represents the FFT symbol received from eNBs 1 and 3. These signals were received with a frequency offset mostly outside of UE 1001's pull-in range. As illustrated in FIG. 13, signals that arrive within the CP of a UE may be adjusted so that the offset in time or frequency is corrected. Signals 1300-1302 fall within the CP and, therefore, would be adjusted by a UE with a single FFT frontend. However, if the UE associated with FIG. 13 operates in an asynchronous network and receives a strong signal outside of the CP range, signal 1303, the UE would not be able to correct the signal offset or even cancel the signal.

As noted with regard to the example aspects illustrated in FIGS. 7 and 8, multiple S/P FFTs in the frontend of UE 1001 may be beneficial to accommodate signals received that are highly offset or that are not synchronous. In such a configuration, UE 1001 could group eNBs 0, 1, and 2 into a first group to be tracked and offset using the first S/P FFT processing module and group eNB 3 into a second group to be tracked and offset using one of the additional S/P FFT processing modules. The second group would be able to recover the signals from the signals of eNB 3 even though there would be substantial offset from the signals in the first group from eNBs 0, 1, and 2. After recovering the signals from eNB 3, the UE 1001 could cancel that signal or use it for further processing.

Figure 14:
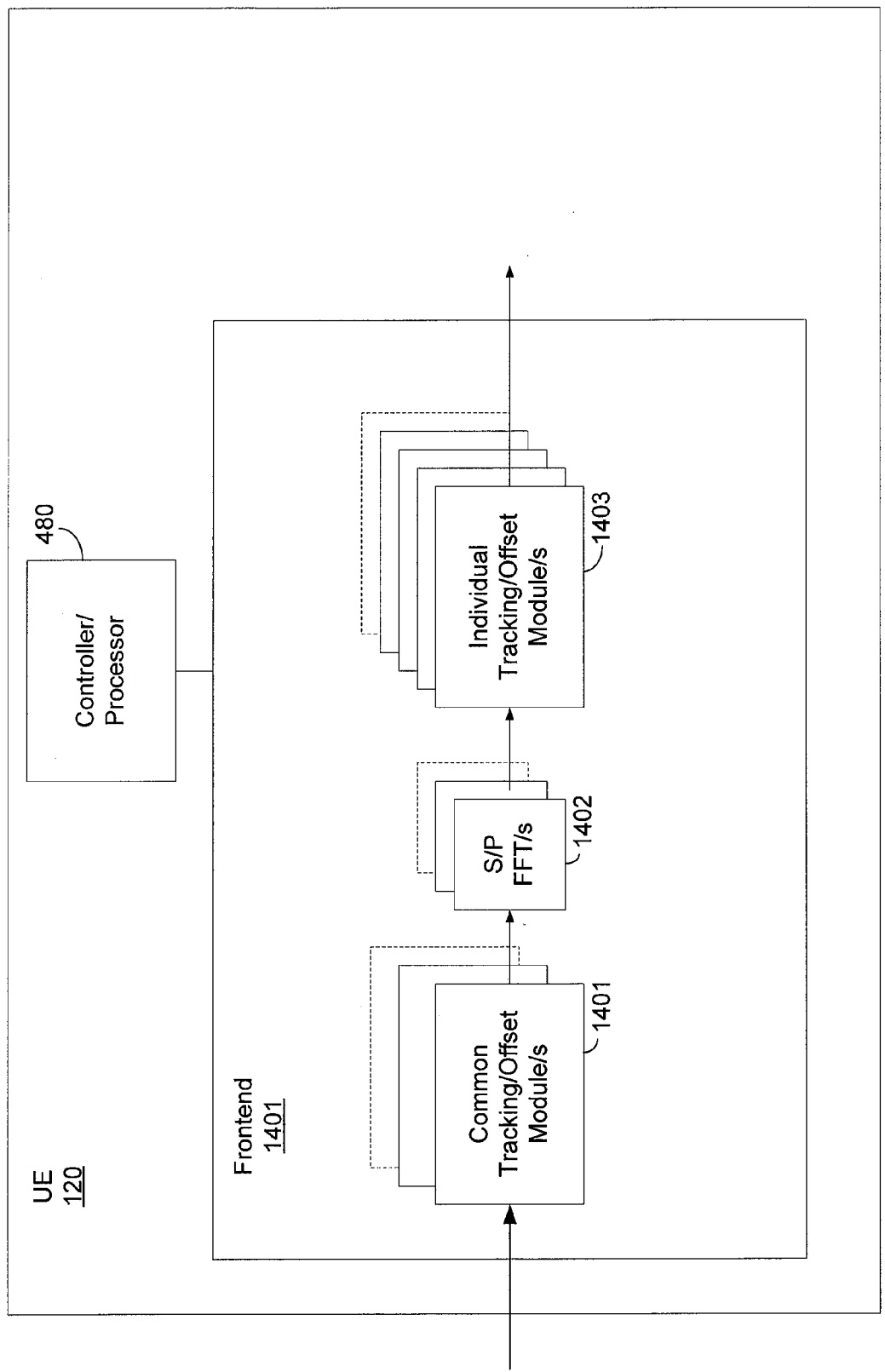
FIG. 14 is a conceptual block diagram illustrating a UE configured according to one aspect of the present disclosure.

FIG. 14 is a conceptual block diagram illustrating a UE 120 configured according to one aspect of the present disclosure. UE 120 includes a frontend 1401 that performs initial processing of incoming signals. Controller/processor 480 controls, manages, and operates all of the functionality of UE 120, including the components and modules contained in the frontend 1401. As a raw signal is received by UE 120, after initial processing and conditioning the signal, one or more common tracking/offset modules 1401 provide a means for tracking common offsets corresponding to one or more groups of cells. Depending on the configuration, the common tracking/offset modules 1401 may track offsets in either the frequency or time domains. In embodiments having multiple such common tracking/offset modules 1401, logic executed by the controller/processor 480 groups the signals according to offset proximity to the signal of the serving cell. The common tracking/offset modules 1401 track the particular offset and may modify or adjust the signals accordingly in the time domain.

One or more serial-to-parallel fast Fourier transforms (S/P FFTs) 1402 provide a means for transforming the samples into corresponding frequency domain symbols using the tracked offsets and a transformation operation. A configuration with two such S/P FFTs 1402 provides greater flexibility over a UE with only a single S/P FFT in the frontend. However, more than two S/P FFTs 1402 would be within the scope of the present disclosure.

Once transformed into the frequency domain, multiple individual tracking/offset modules 1403 provide means for tracking individual offsets at the symbol level for the signals of each individual cell contained with the grouped cells. The common time domain signals are processed in the aggregate with the signal from each of the cells in the same aggregate time domain signal. Once transformed into the frequency domain, the common signals of each group may be separated into the individual component signals from the associated cells. The offset for these individual signals in the frequency domain is tracked and adjusted by the individual tracking/offset modules 1403. The resulting adjusted individual signals are then passed from the frontend 1401 for further processing by UE 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the non-transitory storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer-readable media and communication media including any medium that facilitates transfer of a computer program from one place to another. A non-transitory storage media may be any available media that can be accessed by a general purpose or special purpose computer. By way of example, and not limitation, such non-transitory computer-readable media may comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a user equipment (UE), comprising:
    tracking a first common offset corresponding to a first group of cells, said first group of cells comprising a serving cell and at least one cell having an offset within a first range of said serving cell;
    transforming a plurality of time domain samples into a first plurality of frequency domain symbols using said offset and a first transformation operation assigned to said first group of cells;
    tracking a first individual offset of said first plurality of frequency domain symbols for each cell within said first group of cells;
    tracking a second common offset corresponding to a second group of cells, said second group of cells comprising at least one cell having an offset within a second range of said serving cell;
    transforming said plurality of time domain samples into a second plurality of frequency domain symbols using said second offset and a second transformation operation assigned to said second group of cells; and
    tracking a second individual offset of said second plurality of frequency domain symbols for each cell within said second group of cells.

2. The method of claim 1 further comprising:
    tracking a third common offset corresponding to a third group of cells, said third group of cells comprising at least one cell having an offset within a third range of said serving cell;
    transforming said plurality of time domain samples into a third plurality of frequency domain symbols using said third offset and a third transformation operation assigned to said third group of cells;
    tracking a third individual offset of said third plurality of frequency domain symbols for each cell within said third group of cells.

3. The method of claim 1 wherein said first and second offsets are timing offsets.

4. The method of claim 1 wherein said first and second offsets are frequency offsets.

5. The method of claim 1 further comprising:
    processing said first and second pluralities of frequency domain symbols.

6. The method of claim 5 wherein said processing comprises one or more of:
    estimating a channel of said first and second pluralities of frequency domain symbols;
    demodulating said first and second pluralities of frequency domain symbols; and
    decoding said first and second pluralities of frequency domain symbols.

7. The method of claim 1 further comprising:
    adjusting said plurality of time domain samples according to said tracked first common offset;
    adjusting said plurality of time domain samples according to said tracked second common offset;
    for each of said cells in said first group of cells, adjusting said first plurality of frequency domain symbols according to said tracked first individual offset; and
    for each of said cells in said second group of cells, adjusting said second plurality of frequency domain symbols according to said tracked second individual offset.

8. The method of claim 1 further comprising:
    applying interference cancellation among a first transformation cluster, said first transformation cluster comprising said plurality of time domain samples and said first plurality of frequency domain symbols of said first group of cells; and
    applying interference cancellation among a second transformation cluster, said second transformation cluster comprising said plurality of time domain samples and said first plurality of frequency domain symbols of said second group of cells.

9. The method of claim 8 further comprising:
    determining a cancellation order of said first and second transformation clusters.

10. The method of claim 8 further comprising:
    applying time domain interference cancellation for a subset of clusters, said subset of clusters comprising a subset of:
        at least one signal from one or more of said plurality of time domain samples and said first plurality of frequency domain symbols of said first transformation cluster; and
        at least one signal from one or more of said plurality of time domain samples and said second plurality of frequency domain symbols of said second transformation cluster.

11. The method of claim 8 further comprising:
    applying frequency domain interference cancellation for a subset of clusters, said subset of clusters comprising a subset of:
        at least one signal from one or more of said plurality of time domain samples and said first plurality of frequency domain symbols of said first transformation cluster; and
        at least one signal from one or more of said plurality of time domain samples and said second plurality of frequency domain symbols of said second transformation cluster.

12. The method of claim 8 wherein a total number of transformation clusters is determined by one or more of:
   a relative timing/frequency offset of a plurality of cells within range of said UE;
   a relative signal strength of said plurality of cells;
   a location of said serving cell.

13. The method of claim 12 wherein said total number of transformation clusters is adjusted dynamically across different subframes.

14. The method of claim 8 further comprising:
   applying interference cancellation iteratively between each of said first transformation cluster and said second transformation cluster.

15. The method of claim 14 wherein one of said first transformation cluster and said second transformation cluster uses time domain interference cancellation.

16. The method of claim 15 wherein another of said first transformation cluster and said second transformation cluster uses frequency domain interference cancellation after use of said time domain interference cancellation.

17. A user equipment (UE) configured for wireless communication, comprising:
   means for tracking a first common offset corresponding to a first group of cells, said first group of cells comprising a serving cell and at least one cell having an offset within a first range of said serving cell;
   means for transforming a plurality of time domain samples into a first plurality of frequency domain symbols using said offset and a first transformation operation assigned to said first group of cells;
   means for tracking a first individual offset of said first plurality of frequency domain symbols for each cell within said first group of cells;
   means for tracking a second common offset corresponding to a second group of cells, said second group of cells comprising at least one cell having an offset within a second range of said serving cell;
   means for transforming said plurality of time domain samples into a second plurality of frequency domain symbols using said second offset and a second transformation operation assigned to said second group of cells; and
   means for tracking a second individual offset of said second plurality of frequency domain symbols for each cell within said second group of cells.

18. The UE of claim 17 further comprising:
   means for tracking a third common offset corresponding to a third group of cells, said third group of cells comprising at least one cell having an offset within a third range of said serving cell;
   means for transforming said plurality of time domain samples into a third plurality of frequency domain symbols using said third offset and a third transformation operation assigned to said third group of cells;
   means for tracking a third individual offset of said third plurality of frequency domain symbols for each cell within said third group of cells.

19. The UE of claim 17 wherein said first and second offsets are timing offsets.

20. The UE of claim 17 wherein said first and second offsets are frequency offsets.

21. The UE of claim 17 further comprising:
   means for processing said first and second pluralities of frequency domain symbols.

22. The UE of claim 17 further comprising:
   means for adjusting said plurality of time domain samples according to said tracked first common offset;
   means for adjusting said plurality of time domain samples according to said tracked second common offset;
   for each of said cells in said first group of cells, means for adjusting said first plurality of frequency domain symbols according to said tracked first individual offset; and
   for each of said cells in said second group of cells, means for adjusting said second plurality of frequency domain symbols according to said tracked second individual offset.

23. The UE of claim 17 further comprising:
   means for applying interference cancellation among a first transformation cluster, said first transformation cluster comprising said plurality of time domain samples and said first plurality of frequency domain symbols of said first group of cells; and
   means for applying interference cancellation among a second transformation cluster, said second transformation cluster comprising said plurality of time domain samples and said first plurality of frequency domain symbols of said second group of cells.

24. A computer program product for wireless communications by a user equipment (UE) in a wireless network, comprising:
   a non-transitory computer-readable medium having program code recorded thereon, said program code comprising:
      program code to track a first common offset corresponding to a first group of cells, said first group of cells comprising a serving cell and at least one cell having an offset within a first range of said serving cell;
      program code to transform a plurality of time domain samples into a first plurality of frequency domain symbols using said offset and a first transformation operation assigned to said first group of cells;
      program code to track a first individual offset of said first plurality of frequency domain symbols for each cell within said first group of cells;
      program code to track a second common offset corresponding to a second group of cells, said second group of cells comprising at least one cell having an offset within a second range of said serving cell;
      program code to transform said plurality of time domain samples into a second plurality of frequency domain symbols using said second offset and a second transformation operation assigned to said second group of cells; and
      program code to track a second individual offset of said second plurality of frequency domain symbols for each cell within said second group of cells.

25. The computer program product of claim 24 further comprising:
   program code to track a third common offset corresponding to a third group of cells, said third group of cells comprising at least one cell having an offset within a third range of said serving cell;
   program code to transform said plurality of time domain samples into a third plurality of frequency domain symbols using said third offset and a third transformation operation assigned to said third group of cells;
   program code to track a third individual offset of said third plurality of frequency domain symbols for each cell within said third group of cells.

26. The computer program product of claim 24 wherein said first and second offsets are timing offsets.

27. The computer program product of claim 24 wherein said first and second offsets are frequency offsets.

28. The computer program product of claim 24 further comprising:
program code to process said first and second pluralities of frequency domain symbols.

29. The computer program product of claim 24 further comprising:
program code to adjust said plurality of time domain samples according to said tracked first common offset;
program code to adjust said plurality of time domain samples according to said tracked second common offset;
program code, executable for each of said cells in said first group of cells, to adjust said first plurality of frequency domain symbols according to said tracked first individual offset; and
program code, executable for each of said cells in said second group of cells, to adjust said second plurality of frequency domain symbols according to said tracked second individual offset.

30. The computer program product of claim 24 further comprising:
program code to apply interference cancellation among a first transformation cluster, said first transformation cluster comprising said plurality of time domain samples and said first plurality of frequency domain symbols of said first group of cells; and
program code to apply interference cancellation among a second transformation cluster, said second transformation cluster comprising said plurality of time domain samples and said first plurality of frequency domain symbols of said second group of cells.

31. A user equipment (UE) configured for wireless communication, said UE comprising
at least one processor; and
a memory coupled to said at least one processor,
wherein said at least one processor is configured:
to track a first common offset corresponding to a first group of cells, said first group of cells comprising a serving cell and at least one cell having an offset within a first range of said serving cell;
to transform a plurality of time domain samples into a first plurality of frequency domain symbols using said offset and a first transformation operation assigned to said first group of cells;
to track a first individual offset of said first plurality of frequency domain symbols for each cell within said first group of cells;
to track a second common offset corresponding to a second group of cells, said second group of cells comprising at least one cell having an offset within a second range of said serving cell;
to transform said plurality of time domain samples into a second plurality of frequency domain symbols using said second offset and a second transformation operation assigned to said second group of cells; and
to track a second individual offset of said second plurality of frequency domain symbols for each cell within said second group of cells.

32. The UE of claim 31 wherein said at least one processor is further configured:
to track a third common offset corresponding to a third group of cells, said third group of cells comprising at least one cell having an offset within a third range of said serving cell;
to transform said plurality of time domain samples into a third plurality of frequency domain symbols using said third offset and a third transformation operation assigned to said third group of cells;
to track a third individual offset of said third plurality of frequency domain symbols for each cell within said third group of cells.

33. The UE of claim 31 wherein said first and second offsets are timing offsets.

34. The UE of claim 31 wherein said first and second offsets are frequency offsets.

35. The UE of claim 31 wherein said at least one processor is further configured:
to process said first and second pluralities of frequency domain symbols.

36. The UE of claim 35 wherein said processing comprises one or more of:
to estimate a channel of said first and second pluralities of frequency domain symbols;
to demodulate said first and second pluralities of frequency domain symbols; and
to decode said first and second pluralities of frequency domain symbols.

37. The UE of claim 31 wherein said at least one processor is further configured:
to adjust said plurality of time domain samples according to said tracked first common offset;
to adjust said plurality of time domain samples according to said tracked second common offset;
for each of said cells in said first group of cells, to adjust said first plurality of frequency domain symbols according to said tracked first individual offset; and
for each of said cells in said second group of cells, to adjust said second plurality of frequency domain symbols according to said tracked second individual offset.

38. The UE of claim 31 wherein said at least one processor is further configured:
to apply interference cancellation among a first transformation cluster, said first transformation cluster comprising said plurality of time domain samples and said first plurality of frequency domain symbols of said first group of cells; and
to apply interference cancellation among a second transformation cluster, said second transformation cluster comprising said plurality of time domain samples and said first plurality of frequency domain symbols of said second group of cells.

39. The UE of claim 38 wherein said at least one processor is further configured:
to determine a cancellation order of said first and second transformation clusters.

40. The UE of claim 38 wherein said at least one processor is further configured:
to apply time domain interference cancellation for a subset of clusters, said subset of clusters comprising a subset of:
at least one signal from one or more of said plurality of time domain samples and said first plurality of frequency domain symbols of said first transformation cluster; and
at least one signal from one or more of said plurality of time domain samples and said second plurality of frequency domain symbols of said second transformation cluster.

41. The UE of claim 38 wherein said at least one processor is further configured:
to apply frequency domain interference cancellation for a subset of clusters, said subset of clusters comprising a subset of:

at least one signal from one or more of said plurality of time domain samples and said first plurality of frequency domain symbols of said first transformation cluster; and at least one signal from one or more of said plurality of time domain samples and said second plurality of frequency domain symbols of said second transformation cluster.

42. The UE of claim 38 wherein a total number of transformation clusters is determined by one or more of:
a relative timing/frequency offset of a plurality of cells within range of said UE;
a relative signal strength of said plurality of cells;
a location of said serving cell.

43. The UE of claim 42 wherein said total number of transformation clusters is adjusted dynamically across different subframes.

44. The UE of claim 8 wherein said at least one processor is further configured:
to apply interference cancellation iteratively between each of said first transformation cluster and said second transformation cluster.

45. The UE of claim 44 wherein one of said first transformation cluster and said second transformation cluster uses time domain interference cancellation.

46. The UE of claim 45 wherein another of said first transformation cluster and said second transformation cluster uses frequency domain interference cancellation after use of said time domain interference cancellation.

* * * * *